Patented Sept. 6, 1949

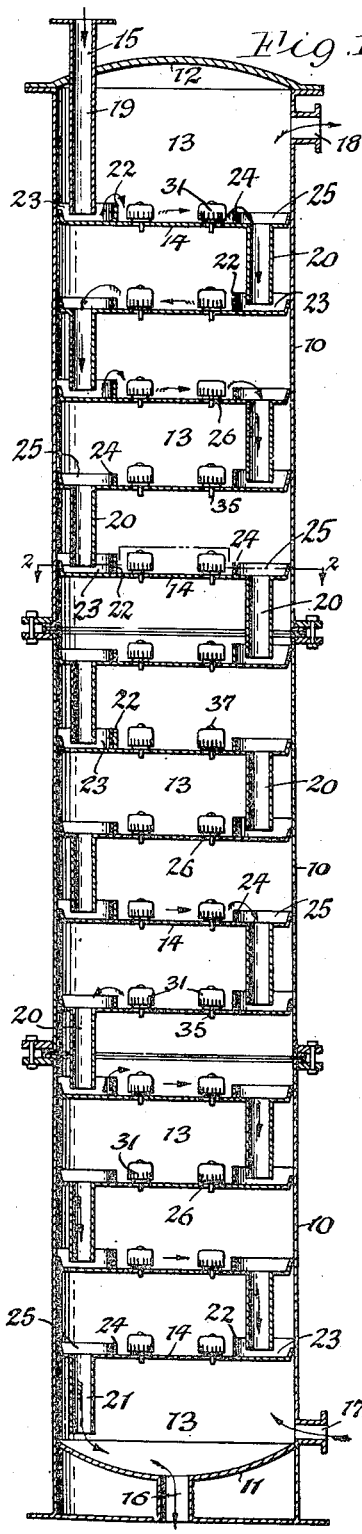
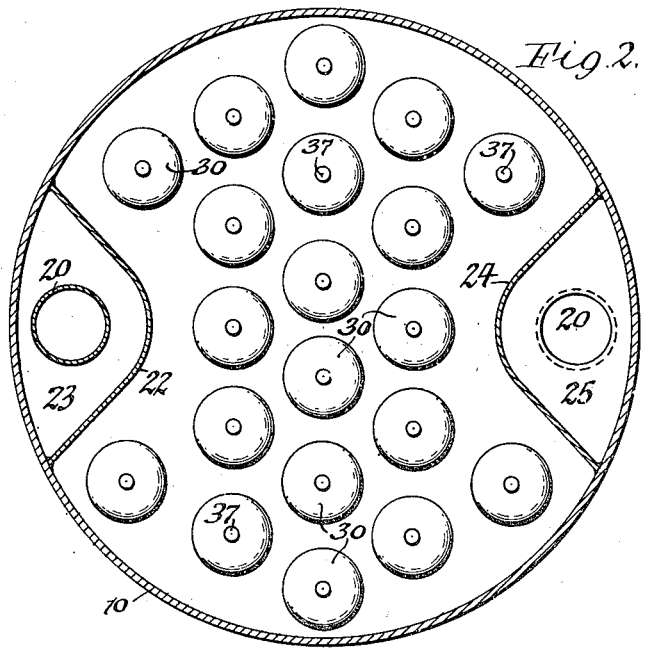
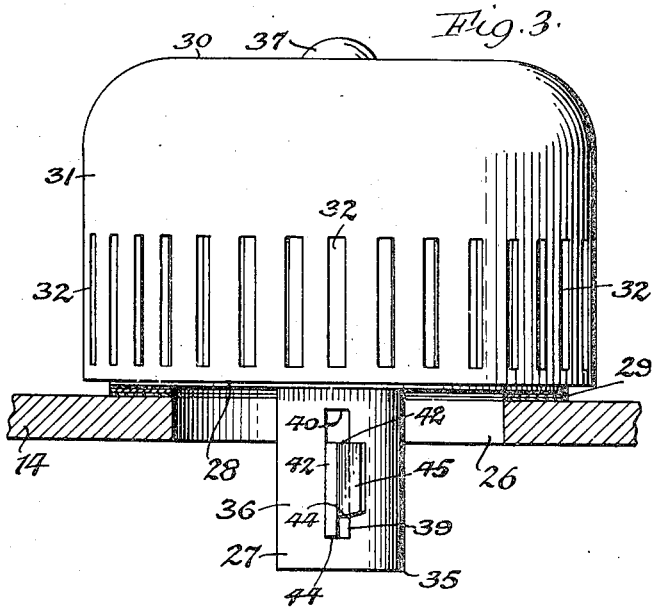

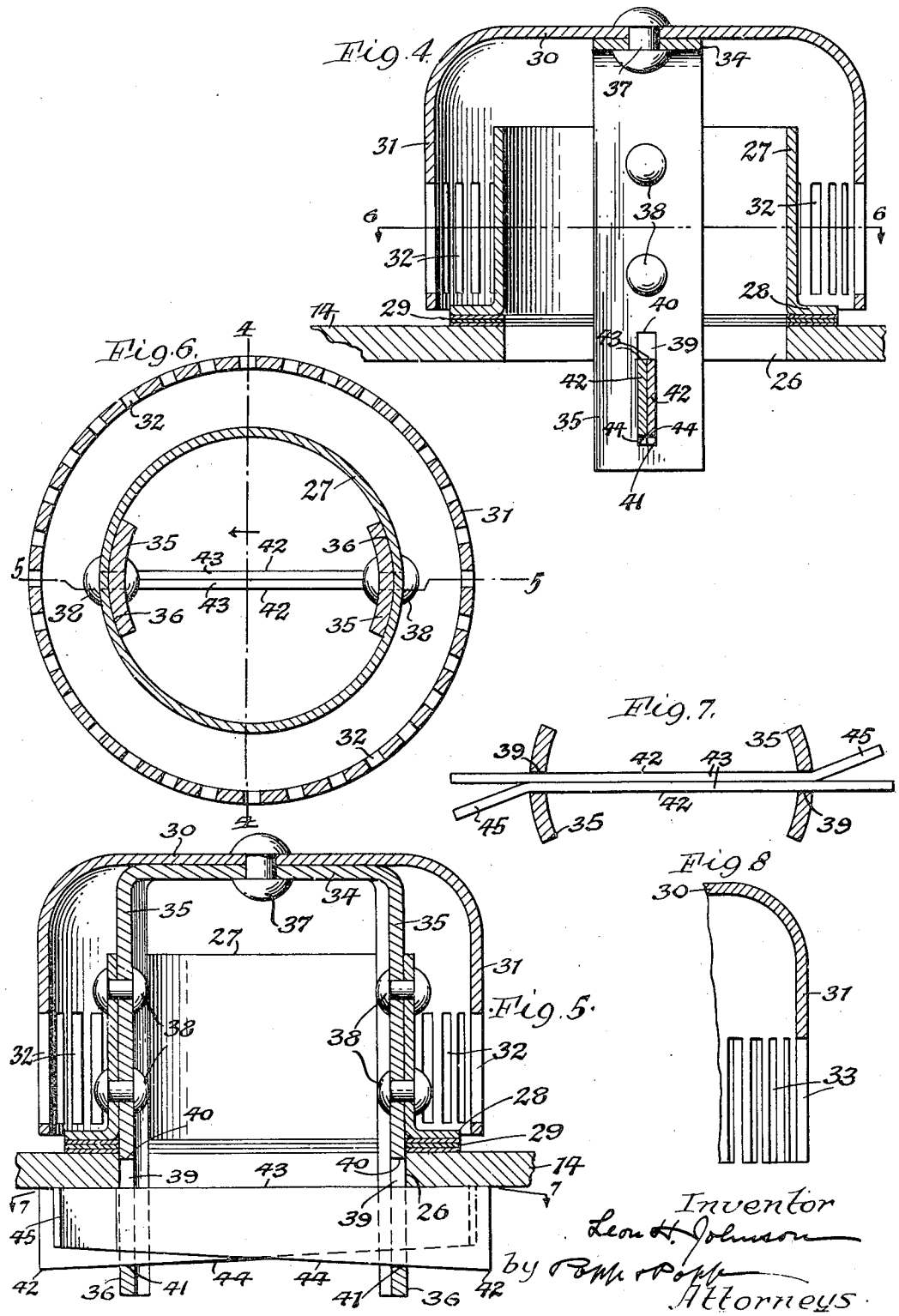

2,480,862

UNITED STATES PATENT OFFICE 2,480,862

BUBBLE CAP ASSEMBLY FOR GAS OR VAPOR AND LIQUID CONTACT APPARATUS

Leon H. Johnson, Warren, Pa.

Application February 6, 1946, Serial No. 645,858

2 Claims. (Cl. 261—114)

This invention relates to an improved bubble cap assembly and means for mounting the same on a tray of a gas or vapor and liquid contact apparatus, such as are used for fractionating, absorbing, scrubbing and like purposes in which gas or vapor are contacted with a liquid, in the chemical and petroleum refining industries.

In apparatus of this character gas or vapor passes successively through chimneys, tubes or nipples from one tray to another of a column or tower and bubbles through a plurality of pools or streams of liquid in each tray, the gas or vapor being supplied at the bottom of the tower and discharged at the top thereof and the liquid being supplied at the top and discharged at the bottom of the tower.

During this counterflow of gas or vapor and liquid any constituents in the gas or vapor which are condensed by contact with the liquid escape with the latter at the bottom of the tower while any remaining unabsorbed or uncondensed gas or vapor is drawn off from the top of the tower.

It is the object of this invention to provide a bubble cap unit or assembly and means for mounting the same on the tray of a contact apparatus which is simple and durable in construction and can be quickly and readily fastened in its operative position so that a plurality of such units or assemblies are all of the same operative height and maintain a uniform level with the liquid in each tray and thus secure the maximum efficiency of the apparatus.

In the accompanying drawings:

Fig. 1 is a vertical sectional view of a contact apparatus, on a reduced scale, equipped with bubble cap assemblies constructed in accordance with this invention.

Fig. 2 is a horizontal section, on a larger scale, taken on line 2—2, Fig. 1, looking downwardly.

Fig. 3 is a side elevation, partly in section, of a full size bubble cap assembly embodying this invention and mounted on the bottom or plate of a tray.

Fig. 4 is a vertical section of the bubble cap assembly taken on line 4—4, Fig. 6.

Fig. 5 is a similar view taken on line 5—5, Fig. 6.

Fig. 6 is a horizontal section taken on line 6—6, Fig. 4.

Fig. 7 is a fragmentary horizontal section taken on line 7—7, Fig. 5.

Fig. 8 is a fragmentary vertical section showing a modified form of the cap, dome or hood of the bubble cap assembly as compared with the construction shown in Figs. 3, 4 and 5.

In the following description like characters of reference indicate similar parts in the several views of the drawings:

The contact apparatus which embodies the present invention has the general form of an upright column or tower and includes a vertical vessel which is operated under positive or negative pressure and sealed from the outer atmosphere. The side body or wall of this vessel is preferably constructed of a plurality of upright cylindrical sections 10 which are superposed one upon another and have their opposing ends connected with each other in any suitable manner, and at its lower end this column or tower is closed by a lower head 11 which is secured to the lower end of the lowermost body section and at its upper end this column is closed by an upper head 12 which is secured to the upper end of the uppermost body section.

The space within this vessel is divided into a plurality of treating chambers 13 arranged in a vertical series and formed by means of trays or partitions 14 having the form of horizontal plates which are arranged at intervals throughout the height of the column and each tray being connected at its peripheral edge with the bore of the respective body section in any suitable manner.

The liquid used in the process of fractionating, scrubbing or condensing purposes is introduced into the uppermost treating chamber through an inlet 15 which communicates with the uppermost treating chamber and preferably extends through the upper head of the column. From this inlet the liquid passes successively through each treating chamber from the uppermost to the lowermost and finally escapes from the vessel through an outlet 16 which preferably extends through the lower head of the vessel, as shown in Fig. 1. The gas or vapor which is utilized in any particular process of fractionating, condensing or scrubbing is introduced through an inlet 17 which opens into the lowermost treating chamber, then passes successively upwardly through the several treating chambers from the lowermost to the uppermost of these chambers and finally escapes through an outlet 18 in the uppermost treating chamber. During the downward passage of the liquid through the several treating chambers and the upward passage of the gas or vapor through these chambers the liquid and gas or vapor are brought into intimate contact with each other for carrying out the respective process, such as scrubbing blast furnace gases to wash impurities out of the same, fractionating hot petroleum which is taken from a still for producing gasoline, naptha and the like, and also when employing the same as a condenser by supplying liquid at the top of the column and draining the same off at the bottom thereof together with any constituents which have been absorbed thereby from the upwardly moving gas or vapor, the uncondensed or unabsorbed parts of the gas or vapor escaping at the top of the column.

In its downward flow through the several treating chambers the liquid passes successively from the inlet of the uppermost chamber, downwardly through a downtake tube 19 which delivers the same upon the upper side of the uppermost tray adjacent to one side of the upright side wall of the vessel, thence flows horizontally across the upper side of this tray to the upper end of an intermediate downtake tube 20 which opens upwardly adjacent to the opposite side of the side wall of the vessel and terminates at its lower end above the corresponding part of the next lower tray, thence flows horizontally in the opposite direction over the last mentioned tray to the upper inlet end of the next following intermediate downtake tube 20 which connects with the respective tray axially in line with the liquid inlet 15 and thereafter the liquid flows in like manner successively from one treating chamber to the other and over the several trays and through successive downtake tubes 20 and horizontally back and forth from one side of the vessel to the other until the liquid is finally discharged from the lowermost downtake tube 21 into the lowermost treating chamber 13 and then escapes through the outlet 17 in the bottom of the latter.

In order to maintain a predetermined depth of stream on the upper side of each of the trays through which the vapor or gas which is used in a particular process is adapted to pass or bubble, the upper side of each tray is provided with a receiving weir or dam 22 which projects upwardly therefrom and forms a receiving bay 23 around the lower end of the respective liquid downtake tube on one side of the column and also with an outlet weir or dam 24 which projects upwardly from each tray and forms a delivery bay 25 around the upper end of each intermediate and lowermost downtake tubes.

The height of the receiving weirs 22 are somewhat greater than the height of the delivery weirs 25, thereby insuring a flow of the liquid from the receiving bays to the delivery bays of each tray and maintaining the depth of each of these streams or pools equal to the height of the delivery weir on the respective tray.

The gas or vapor supplied through the inlet 17 at the lower end of the vessel passes successively through transfer openings or holes 26 in the several trays from the lowermost to the uppermost treating chamber and then escapes through the outlet 18 communicating with the uppermost of these chambers. Each of the trays is provided with a plurality of these gas or vapor transfer holes or openings. As the gas or vapor passes upwardly through each of these holes from the lower to the next upper treating chamber, this gas or vapor is compelled to dip downwardly through the stream or pool of liquid on the respective tray and bubble upwardly through the same for the purpose of intimately contacting this liquid and gas or vapor and carrying out the function of the respective process. This dipping or submerging of the gas or vapor in the liquid is effected by a bubble cap assembly which embodies this invention and in its preferred form, as shown in the drawings, is constructed as follows:

The numeral 27 represents a chimney or uptake tube forming part of a conduit whereby vapor or gas is conducted from the upper part of a lower treating chamber to the liquid on the bottom of the next upper treating chamber. This chimney is preferably of cylindrical form and has its lower end surrounding the respective gas or vapor transfer hole or opening 26. Means are provided for adjustably mounting this chimney on the upper side of the respective tray so that this chimney together with the other parts of the respective bubble cap assembly can be raised or lowered in order to bring the same in accurate level alinement with the other bubble cap assemblies on the same tray. This is accomplished in accordance with this invention by providing the lower end of each chimney with an outwardly projecting or external annular flange 28 and supporting the same on the upper side of the respective tray by means of one or more thin gaskets, shims or washers 29 arranged around the companion hole 26 so that by using a greater or lesser number of these washers the chimney and the associated parts of the bubble cap assembly may be accurately adjusted in accordance with requirements.

Above each chimney and surrounding the upper part of the same a cap, dome or hood is arranged which is adapted to deflect the gas or vapor issuing from the upper end of the chimney downwardly and underneath the surface of the liquid and compel the same to bubble upwardly through the liquid on the outer side of the dome and thereby cause the gas or vapor and the liquid to be brought in contact with each other for accomplishing the purpose of the intended process. This dome may be of any suitable construction but that shown in Figs. 3, 4, 5 and 6 comprises an upper crown or top 30 which extends horizontally over the upper end of the chimney and an annular skirt or rim 31 of substantially cylindrical form projecting downwardly from the periphery of the crown around the upper part of the respective chimney and terminating at a distance from the top of the respective tray plate 14. The top of the dome is spaced from the upper end of the chimney and the skirt of the same is spaced from the upper part of the periphery of the chimney to produce a uniform volumetric passage whereby the gas or vapor passing upwardly through the opening 26 is first conducted upwardly by the chimney and thence laterally outward in all directions by the crown of the dome and thence downwardly around all sides of the dome and into the liquid below the upper surface thereof and then rises in this liquid on the exterior of the dome. If desired the skirt of the dome may be left whole or intact so that the gas or vapor is compelled to pass downwardly through the liquid to the lower edge of the skirt before the same can escape upwardly above the surface of the liquid, but if desired the skirt may be provided either with a plurality of slots 32 which are formed in an annular row around the skirt and are closed at their upper and lower ends, as shown in Figs. 3, 4 and 5, or these slots, as shown at 33 in Fig. 8, may be formed in the skirt of the dome so that they are closed at their upper ends but open at their lower ends. In either case the upper ends of these slots are arranged below the top of the delivery dams 24 and the level of the liquid in the respective tray so that the gas or vapor which is deflected downwardly by the dome is compelled to submerge or dip into the liquid until it reaches the upper ends of the slots 32 or 33 before the same can escape from the dome into the surrounding liquid.

Means are provided whereby the chimney and dome of the bubble cap assembly are connected so that they are held in a definite position relative to each other and also support the same on the plate or bottom of the tray so that the assembly as a whole may be readily attached to and removed from the tray and reliably held in position after the same is adjusted. The means for this purpose shown in the drawings embody a preferred form of this invention and are constructed as follows:

Within each dome and chimney and the companion transfer hole of the tray is arranged a yoke which has the general form of an inverted U and comprises an upper horizontal cross bar 34 secured to the underside of the crown of the dome, and two vertical legs 35 projecting downwardly from opposite ends of this cross bar through the chimney and the tray hole and terminating at their lower ends some distance below the underside of the tray. The outer sides 36 of the yoke legs are preferably of convex form corresponding to the curvature of the bore of the chimney and the tray opening 26 which convex faces engage these bores, as shown in Figs. 5 and 6 and thereby serve to hold the bubble cap assembly definitely in an axially alined position relative to the transfer hole in the tray. The cross bar of the yoke and the legs of the same may be secured, respectively, to the crown of the dome and to the cylindrical part of the chimney in any suitable manner but it is preferable to employ a single rivet 37 for securing the cross bar to the dome and a pair of rivets 38, for securing each of the legs to the adjacent part of the chimney, as best shown in Figs. 4 and 5.

Fastening means are provided for holding the bubble cap assembly in place on the tray and forming a tight connection between the lower end of the chimney and the top of the tray so as to prevent leakage through the joint between the chimney and the tray and also maintain the bubble cap assembly in its proper position. The preferred means for thus securing the bubble cap assembly to the tray are made in accordance with this invention and constructed as follows:

Each of the legs of the yoke is provided with a vertical fastening slot 39 which is closed at both ends and the upper end 40 of the same is arranged a short distance above the underside of the tray, while the lower end 41 of this slot forms an upwardly facing shoulder which is arranged a substantial distance below the underside of the tray.

The numerals 42, 42 represent two wedges which are arranged side by side and extend horizontally across the lower side of the transfer opening 26 and through the fastening slots 39, 39 in both legs and terminate at their opposite ends underneath the tray on opposite sides of the transfer opening therein. These wedges are preferably constructed in the form of flat strips of metal and each of these wedges engages the opposite end portions of its horizontal upper edge 43 with the underside of the tray on opposite sides of the transfer opening or hole 26. The lower edges 44 of these wedges incline lengthwise in opposite directions and the incline of one of these wedges engages the shoulder 41 at the lower end of the slot 39 in one of the yoke legs, while the incline of the other wedge engages the shoulder 41 at the lower end of the slot 39 in the other leg so that the wide or large part of each of these wedges engages its upper and lower edges with the underside of the tray and the lower end of the respective yoke leg, while the narrow or small part of the same only engages its upper edge with the underside of the tray but its lower edge is out of engagement from the lower part of the respective leg.

When mounting the bubble cap assembly on a tray the legs of the yoke are passed downwardly through the transfer opening 26 therein so that the lower end of the chimney is supported on the upper side of the tray and the legs of the yoke project below the underside of the same. Thereafter the wedges are passed horizontally through the fastening slots 39 in the legs in opposite directions so that the same draw the bubble cap assembly toward the upper side of the tray. By employing two wedges in this manner the bubble cap assembly is drawn downwardly uniformly on opposite sides of its center and thereby causes the effect of the wedge means to be equalized so that the bubble cap assembly will be firmly and reliably held in an upright position on the tray around the respective transfer hole therein.

After each of the wedges has been driven tightly into its operative position through the legs of the yoke and against the underside of the tray, the same is locked in this position by bending the small end 45 of each wedge laterally part way across the adjacent outer side of the respective yoke leg, as shown in Figs. 3, 5 and 7, thereby preventing this wedge from accidentally moving backwardly or becoming loose but instead remaining tight and holding the respective bubble cap assembly in its proper operative position.

In order to secure the maximum efficiency of this apparatus it is necessary to maintain the upper ends of the vertical slots in the skirt of the several bubble cap assemblies in horizontal alinement so that the level of the liquid stream or pool relative to the several bubble cap assemblies will be even and thereby distribute the contact effect between the liquid and the gas or vapor uniformly among the several bubble cap assemblies. In order to secure uniformity in this contacting action between the liquid and the gas or vapor among the several bubble cap assemblies and compensate for any unevenness or lack of uniformity that may exist on the upper side of the tray, the shims, gaskets or washers between the flanges at the lower ends of the chimney and the top of the tray are made very thin and the required number of the same are placed in the form of a stack between the top of the tray and the lower end of each chimney so that the upper ends of the gas or vapor slots 32 or 33 in the dome of the respective bubble cap assembly will be maintained in horizontal alinement with the upper ends of the corresponding slots 32 or 33 in the other bubble cap assemblies after the same have been fastened in their several positions on the tray.

By selecting the proper number of gaskets or shims 29 for producing a joint between the lower end of each chimney and the tray, it is possible to properly locate the several bubble cap assemblies so that they all operate uniformly and thus permit of obtaining the maximum contacting function between the liquid and the gas or vapor regardless of any unevenness of the upper side of the tray.

As a whole this bubble cap assembly and the means for mounting the same on the plate of a tray are comparatively simple in construction, the same can be produced and installed at low cost and they are also capable of being readily and easily mounted so as to secure absolute uniformity in the operation of the several bubble cap assemblies without requiring extreme accuracy in the manufacture of the other parts of the apparatus.

I claim as my invention:

1. In a bubble tower having a horizontal tray provided with a hole, the combination therewith of a bubble cap assembly comprising a vertically extending chimney having a continuous external flange at its lower end and supported on the upper surface of said tray around said hole, gasket means interposed between said flange and said tray and sealing the joint therebetween, a dome covering the upper end of said chimney and having a crown arranged above and in spaced relation to the upper end face of said chimney and a skirt depending from said crown and surrounding the upper portion of said chimney in spaced relation thereto, a U-shaped yoke having a cross bar secured to said crown and a pair of legs depending from said cross bar, said vertical legs engaging the inner surface of said chimney on opposite sides thereof and being secured thereto and projecting downwardly through said hole and terminating below the lower surface of said tray, and means arranged to fasten said legs to said tray and including a pair of oppositely arranged tapered wedges arranged side by side in vertically extending closed slots provided in said legs with the lower edges of the wider ends of said wedges engaging the lower ends of said slots and the upper edges of said wedges engaging said lower surface of said tray, the portion of the narrow end of each of said wedges projecting outwardly from the adjacent one of said legs being bent laterally thereby to prevent unintentional retrogression of said wedges.

2. A bubble cap assembly for use in a bubble tower having a horizontal tray provided with a hole, comprising a chimney having a continuous external flange at one end thereof and adapted to be supported on the upper surface of said tray around said hole, a dome covering the other end of said chimney and having a crown arranged opposite and in spaced relation to the end face of said other end of said chimney and a skirt projecting from said crown and surrounding the said other end portion of said chimney in spaced relation thereto, a U-shaped yoke having a cross bar secured to said crown and a pair of legs projecting from said cross bar, said legs engaging the inner surface of said chimney on opposite sides thereof and being secured thereto and projecting outwardly beyond said one end of said chimney, the outer ends of said legs being provided with closed slots extending generally longitudinally of said legs, and a pair of tapered wedges adapted to be driven in opposite directions through said slots whereby the edges on one side of the wider ends of said wedges engage the outer ends of said slots and the edges on the other side of said wedges engage the lower surface of said tray.

LEON H. JOHNSON.

REFERENCES CITED

The following references are of record in the file of this patent:

UNITED STATES PATENTS

| Number | Name | Date |
|---|---|---|
| 2,398,953 | O'Brien | Apr. 23, 1946 |

FOREIGN PATENTS

| Number | Country | Date |
|---|---|---|
| 495,075 | France | June 17, 1919 |
| 13,599 | Great Britain | June 4, 1914 |